US008478198B2

(12) United States Patent
Gupta

(10) Patent No.: US 8,478,198 B2
(45) Date of Patent: Jul. 2, 2013

(54) INTERFERENCE MANAGEMENT MESSAGING INVOLVING TERMINATION OF A REQUEST FOR REDUCTION IN INTERFERENCE

(75) Inventor: Rajarshi Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 986 days.

(21) Appl. No.: 12/062,375

(22) Filed: Apr. 3, 2008

(65) Prior Publication Data
US 2009/0253449 A1 Oct. 8, 2009

(51) Int. Cl.
*H04B 1/00* (2006.01)
*H04B 15/00* (2006.01)
*H04B 17/00* (2006.01)

(52) U.S. Cl.
USPC ........................................ 455/63.1; 455/67.11

(58) Field of Classification Search
USPC ............ 455/63.1, 67.11, 114.2, 115.1, 278.1, 455/296
See application file for complete search history.

(56) References Cited

U.S. PATENT DOCUMENTS

| 5,677,909 | A | * | 10/1997 | Heide ............................ 370/347 |
| 2006/0221999 | A1 | | 10/2006 | Bachrach et al. |
| 2007/0105574 | A1 | * | 5/2007 | Gupta et al. .................. 455/509 |
| 2007/0105576 | A1 | | 5/2007 | Gupta et al. |
| 2007/0153873 | A1 | | 7/2007 | Fullerton |
| 2008/0008147 | A1 | | 1/2008 | Nakayama |
| 2008/0031224 | A1 | | 2/2008 | Nanda et al. |
| 2008/0144493 | A1 | | 6/2008 | Yeh |
| 2008/0227488 | A1 | | 9/2008 | Zhu et al. |
| 2009/0059949 | A1 | | 3/2009 | Singh et al. |
| 2009/0253450 | A1 | | 10/2009 | Gupta |
| 2011/0207410 | A1 | | 8/2011 | Gupta |
| 2011/0312277 | A1 | | 12/2011 | Gupta |

FOREIGN PATENT DOCUMENTS

| JP | 2003008587 | | * | 1/2003 |
| JP | 2003008587 | A | | 1/2003 |
| JP | 2006287550 | A | | 10/2006 |
| JP | 2008017325 | A | | 1/2008 |
| KR | 20070120992 | A | | 12/2007 |
| WO | 2007051140 | A2 | | 5/2007 |
| WO | 2008021790 | | | 2/2008 |
| WO | WO 2008021784 | | | 2/2008 |

OTHER PUBLICATIONS

Bharghavan V et al: "MACAW: A Media Access Protocol for Wireless LANs" Computer Communication Review, ACM, New York, NY, US, vol. 24, No. 4, Oct. 1, 1994, pp. 212-225, XP000477053 ISSN: 0146-4833.

(Continued)

*Primary Examiner* — Eugene Yun
(74) *Attorney, Agent, or Firm* — Dang M. Vo

(57) ABSTRACT

A set of nodes may communicate in a manner that is asynchronous with respect to the communication between other sets of nodes. To facilitate reservations of resources by different nodes, a node may transmit a message that requests neighboring nodes to limit their interfering transmissions on a given resource and then transmit another message to inform the neighboring nodes that the node is no longer using the resource. To address problems that may be caused by concurrent asynchronous transmissions by different nodes, a messaging scheme may be used to enable a first node to acquire control information transmitted by asynchronous neighboring nodes while the first node was transmitting, and was thereby unable to receive control messages.

30 Claims, 11 Drawing Sheets

OTHER PUBLICATIONS

Chayabejara A et al: "An enhancement of the ieee 802.11 MAC for multihop ad hoc networks" Vehicular Technology Conference, 2003. VTC 2003-Fall. 2003 IEEE 58th Orlando, FL, USA Oct. 6-9, 2003; [IEEE Vehicular Technolgy Conference], Piscataway, NJ, USA,IEEE, US, vol. 5, Oct. 6, 2003, pp. 3020-3024, XP010701272 ISBN: 978-0-7803-7954-1 p. 3022, paragraphs A.,CTS,Timeout.

Garces R et al: "Collision avoidance and resólution multiple access for multichannel wireless networks"INFOCOM 2000. Nineteenth Annual Joint Conference of the IEEE Computer and Communications Societies. Proceedings. IEEE Tel Aviv, Israel Mar. 26-30, 2000, Piscataway, NJ, USAJEEE, US, vol. 2, Mar. 26, 2000, pp. 595-602, XP010376148ISBN: 978-0-7803-5880-5.

Garcia-Luna-Aceves J J et al: "Receiver-Initiated Collision Avoidance in Wireless Networks"Wireless Networks, ACM, New York, NY, US, vol. 8, No. 2/03, Mar. 1, 2002, pp. 249-263, XP001127778 ISSN: 1022-0038.

IEEE Standard for Information Technology—Telecommunications and Information Exchange Between Systems—Local and Metropolitan Area Networks—Specific Requirements. Part 11: Wireless LAN Medium Access Control (MAC) Quality of Service Enhancements IEEE Standard 802.11E-2005, Chapter 11, [Online] Nov. 11, 2005, . pp. 136-159, XP002513502 Inst. Electr. & Electron. Eng., New York, NY, USA ISBN: 0-7381-4772-9 Retrieved from the Internet: URL:ieeexplore.ieee.org>.

International Search Report—PCT/US2008/059593—International Search Authority, European Patent Office, May 20, 2009.

Talucci F et al: "MACA-BI (MACA by Invitation)—a receiver oriented access protocol for wireless multihop networks"Personal, Indoor and Mobile Radio Communications, 1997. Waves of the Year 2000. PIMRC 97., The 8th IEEE International Symposium on Helsinki, Finland Sep. 1-4, 1997, New York, NY, USA IEEE, US, vol. 2, Sep. 1, 1997, pp. 435-439, XP010247684ISBN: 978-0-7803-3871 -5.

Written Opinion—PCT/US2008/059593—International Search Authority European Patent Office—May 20, 2009.

3GPP TR 25.814 V7.1.0, Technical Report, "3rd Generation Partnership Project, Technical Specification Group Radio Access Network, Physical layer aspects for evolved Universal Terrestrial Radio Access (UTRA) (Release 7)", 3GPP TR 25.814 V7.1.0, [Online] vol. 25.814, No. V7.1.0, Sep. 1, 2006, pp. 1-133.

* cited by examiner

INTERFERENCE MANAGEMENT MESSAGING INVOLVING TERMINATION OF A REQUEST FOR REDUCTION IN INTERFERENCE

CROSS-REFERENCE TO RELATED APPLICATION

This application is related to concurrently filed and commonly owned U.S. patent application entitled "REQUESTED TRANSMISSION OF INTERFERENCE MANAGEMENT MESSAGES," and assigned, the disclosure of which is hereby incorporated by reference herein.

BACKGROUND

1. Field

This application relates generally to wireless communication and more specifically, but not exclusively, to messaging for managing interference.

2. Introduction

Deployment of a wireless communication system typically involves implementing some form of interference mitigation scheme. In some wireless communication systems, interference may be caused by neighboring wireless nodes. As an example, in a cellular system, wireless transmissions of a cell phone or a base station of a first cell may interfere with communication between a cell phone and a base station of a neighboring cell. Similarly, in a Wi-Fi network, wireless transmissions of an access terminal or an access point of a first service set may interfere with communication between an access terminal and a base station of a neighboring service set.

U.S. Patent Application Publication No. 2007/0105574, the disclosure of which is hereby incorporated by reference, describes a system where fair-sharing of a wireless channel may be facilitated by joint scheduling of a transmission by transmitting and receiving nodes through the use of a resource utilization message. Here, a transmitting node may request a set of resources based on knowledge of resource availability in its neighborhood and a receiving node may grant the request based on knowledge of resource availability in its neighborhood. For example, the transmitting node may determine channel availability by listening to receiving nodes in its vicinity and the receiving node may determine potential interference by listening to transmitting nodes in its vicinity.

In the event the receiving node is subjected to interference from neighboring transmitting nodes, the receiving node may transmit a resource utilization message in an attempt to cause the neighboring transmitting nodes to limit their interfering transmissions. According to related aspects, a resource utilization message may be weighted to indicate not only that a receiving node is disadvantaged (e.g., due to the interference it sees while receiving) and desires a collision avoidance mode of transmission, but also the degree to which the receiving node is disadvantaged.

A transmitting node that receives a resource utilization message may utilize the fact that it has received a resource utilization message, as well as the weight thereof, to determine an appropriate response. For example, the transmitting node may elect to abstain from transmitting, may reduce its transmit power during one or more designated timeslots, may ignore the resource utilization message, or may respond in some other manner. The advertisement of the resource utilization messages and associated weights may thus provide a collision avoidance scheme that is fair to all nodes in the system.

SUMMARY

A summary of sample aspects of the disclosure follows. It should be understood that any reference to the term aspects herein may refer to one or more aspects of the disclosure.

The disclosure relates in some aspects to asynchronous communication. For example, one set of nodes (e.g., a transmitting node and a receiving node that are associated to communicate with one another) may communicate in a manner that is asynchronous with respect to the communication between other sets of nodes. Here, the timing and duration of a transmission for a given set of nodes may be defined independently of the timing and duration of a transmission for a different set of nodes.

The disclosure relates in some aspects to messaging that facilitates reservation of a resource by different nodes. For example, a node may transmit a message that requests neighboring nodes to limit their interfering transmissions on a given resource (e.g., a carrier) for an unspecified amount of time. When the node has finished using the resource, the node may transmit another message to inform the neighboring nodes that the node is no longer reserving the resource.

The disclosure relates in some aspects to messaging that addresses problems that may be caused by concurrent asynchronous transmissions by different nodes. For example, a messaging scheme may be employed to enable a first node to acquire control information that asynchronous neighboring nodes transmitted while the first node was transmitting. Here, after completing a data transmission, the first node may transmit a message that comprises a request to the neighboring nodes to send control messages. In some aspects such a message may comprise a poll of all receiving nodes that have an outstanding (e.g., non-expired) resource utilization message, whereby these receiving nodes are requested to retransmit their resource utilization messages. After sending its message, the first node may monitor for responsive messages for a defined period of time. In addition, the neighboring nodes may be configured to transmit any control messages they wish to send within the defined period of time. In this way, the first node may acquire any information that it did not receive from the neighboring nodes when it was transmitting data. Moreover, this may be achieved even though the communications of the nodes sending the information are asynchronous to the communications of the first node.

BRIEF DESCRIPTION OF THE DRAWINGS

These and other sample aspects of the disclosure will be described in the detailed description and the appended claims that follow, and in the accompanying drawings, wherein:

Figure 1:
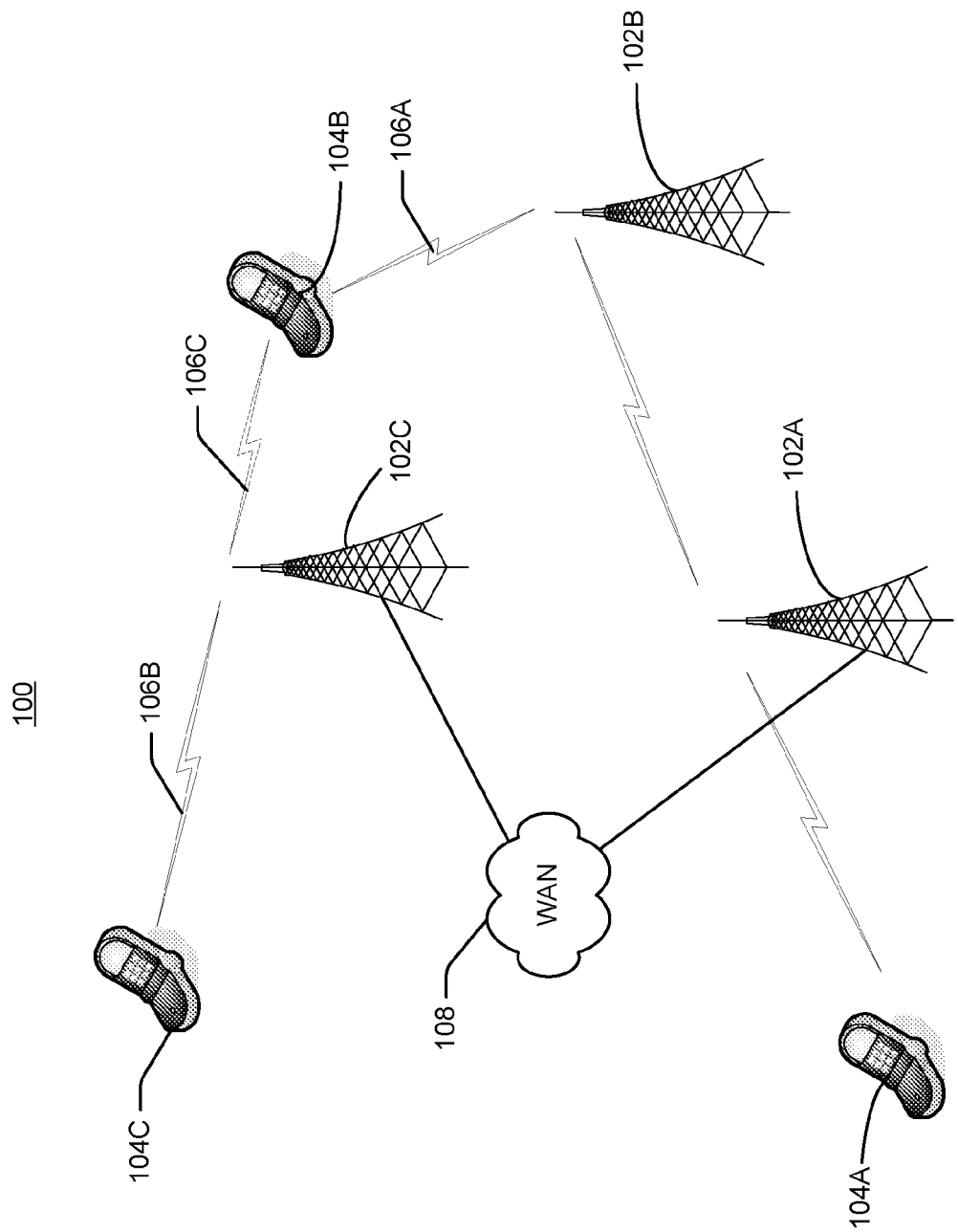
FIG. 1 is a simplified block diagram of several sample aspects of a wireless communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication comprises transmitting a first interference management message (e.g., a resource utilization message) that comprises a request for reduction in interference and transmitting a second interference management message (e.g., a resource release message) that indicates that the request for reduction in interference is terminated. In addition, in some aspects the request for reduction in interference may expire after a defined period of time.

For illustration purposes, the discussion that follows may describe various nodes, components, and operations of a wireless system where an access point communicates with one or more access terminals. It should be appreciated that the teachings herein also may be applicable to other types of nodes, devices, and communication systems.

FIG. 1 illustrates several sample aspects of a wireless communication system 100. The system 100 includes several wireless nodes, generally designated as wireless nodes 102 and 104. A given wireless node may receive and/or transmit one or more traffic flows (e.g., data flows). For example, each wireless node may comprise at least one antenna and associated receiver and transmitter components. In the discussion that follows the term receiving node may be used to refer to a wireless node that is receiving and the term transmitting node may be used to refer to a wireless node that is transmitting. Such a reference does not imply that the wireless node is incapable of performing both transmit and receive operations.

A wireless node may be implemented in various ways. For example, in some implementations a wireless node may comprise an access terminal, a relay point, or an access point.

Referring to FIG. 1, the wireless nodes 102 may comprise access points or relay points and the wireless nodes 104 may comprise access terminals. In some implementations the wireless nodes 102 facilitate communication between the wireless nodes of a network (e.g., a Wi-Fi network, a cellular network, a WiMAX network, or some other type of network). For example, when an access terminal (e.g., an access terminal 104A) is within a coverage area of an access point (e.g., an access point 102A) or a relay point, the access terminal 104A may thereby communicate with another device of the system 100 or some other network that is coupled to communicate with the system 100. Here, one or more of the wireless nodes (e.g., wireless nodes 102A and 102C) may comprise a wired access point that provides connectivity to another network or networks (e.g., a wide area network 108 such as the Internet).

When a wireless node is within communication range of another wireless node, the nodes may associate with one another to establish a communication session. Moreover, different sets of nodes may associate with one another in a given neighborhood. For example, one set of nodes (e.g., associated with an access point 102B in FIG. 1) may form one communication sector while another set of nodes (e.g., associated with the access point 102C) may form a neighboring sector. Consequently, one or more traffic flows may be established in the first sector from a transmitting node (e.g., node 102B) to an associated receiving node (e.g., node 104B). In addition, one or more traffic flows may be established in the second sector from a transmitting node (e.g., node 102C) to an associated receiving node (e.g., node 104C).

In some cases, wireless nodes in the system 100 may transmit at the same time such that transmission by one wireless node may interfere with reception at another wireless node (e.g., a non-associated node of another communication sector). For example, a wireless node 104B of one sector may be receiving from its associated wireless node 102B (as represented by a wireless communication symbol 106A) at the same time that a wireless node 102C of another sector is transmitting to its wireless node 104C (as represented by a symbol 106B). Depending on the distance between the wireless nodes 104B and 102C and the transmission power of the wireless node 102C, transmissions from the wireless node 102C (as represented by a dashed symbol 106C) may interfere with reception at the wireless node 104B. In a similar manner, transmissions from the wireless node 104B may interfere with reception at the wireless node 102C depending on the transmission power of the wireless node 104B.

To mitigate interference such as this, the nodes of a wireless communication system may employ a resource management messaging scheme. For example, a receiving node that wishes to reduce interference during receive operations may transmit a resource utilization message ("RUM") to indicate that this receiving node is requesting priority access to a given resource (e.g., because reception at the node is disadvantaged in some way). A neighboring wireless node that receives the RUM (e.g., a potential interferer) may elect to limit its future transmissions in some way to avoid interfering with reception at the RUM-sending node (i.e., the receiving node that sent the RUM). Here, a decision by a receiving node to transmit a RUM may be based, at least in part, on quality of service associated with data received at that receiving node. For example, a receiving node may transmit a RUM in the event the current level of quality of service for one or more of its links or flows falls below a desired quality of service level. Conversely, the receiving node may not transmit a RUM if the quality of service is acceptable.

In some aspects, different sets of nodes in the system 100 may communicate in an asynchronous manner with respect to other sets of nodes. For example, each set of associated nodes (e.g., a set including nodes 102B and 104B) may independently select when and for how long one of the nodes in the set will transmit data to the other node in the set. In such a case, these nodes may not be able to effectively control interference caused by a neighboring asynchronous node since these nodes may not know when the neighboring node will transmit its control messages (e.g., interference management messages such as RUMs). The discussion that follows describes various techniques that may be employed to reduce interference between nodes and that may be employed in an attempt to ensure that a transmitting node is able to obtain control messages that were transmitted by a neighboring node when the transmitting node was transmitting.

In some aspects, the nodes may communicate through the use of frequency division multiplexed control and data channels. For example, control messages (e.g., RUMs) may be transmitted on a control channel on one frequency band and data may be being transmitted over a data channel on another frequency band. In this way, potential interference between transmitted control messages and data may be mitigated even when these message are transmitted concurrently.

Sample resource management-related operations of a system such as the system 100 will now be discussed in more detail in conjunction with the flow diagrams of FIGS. 2 and 3. For convenience, the operations represented by FIGS. 2 and 3 (or any other operations discussed or taught herein) may be described as being performed by specific components (e.g., components of a system 400 as depicted in FIG. 4). It should be appreciated, however, that these operations may be performed by other types of components and may be performed using a different number of components. It also should be appreciated that one or more of the operations described herein may not be employed in a given implementation.

Figure 2:
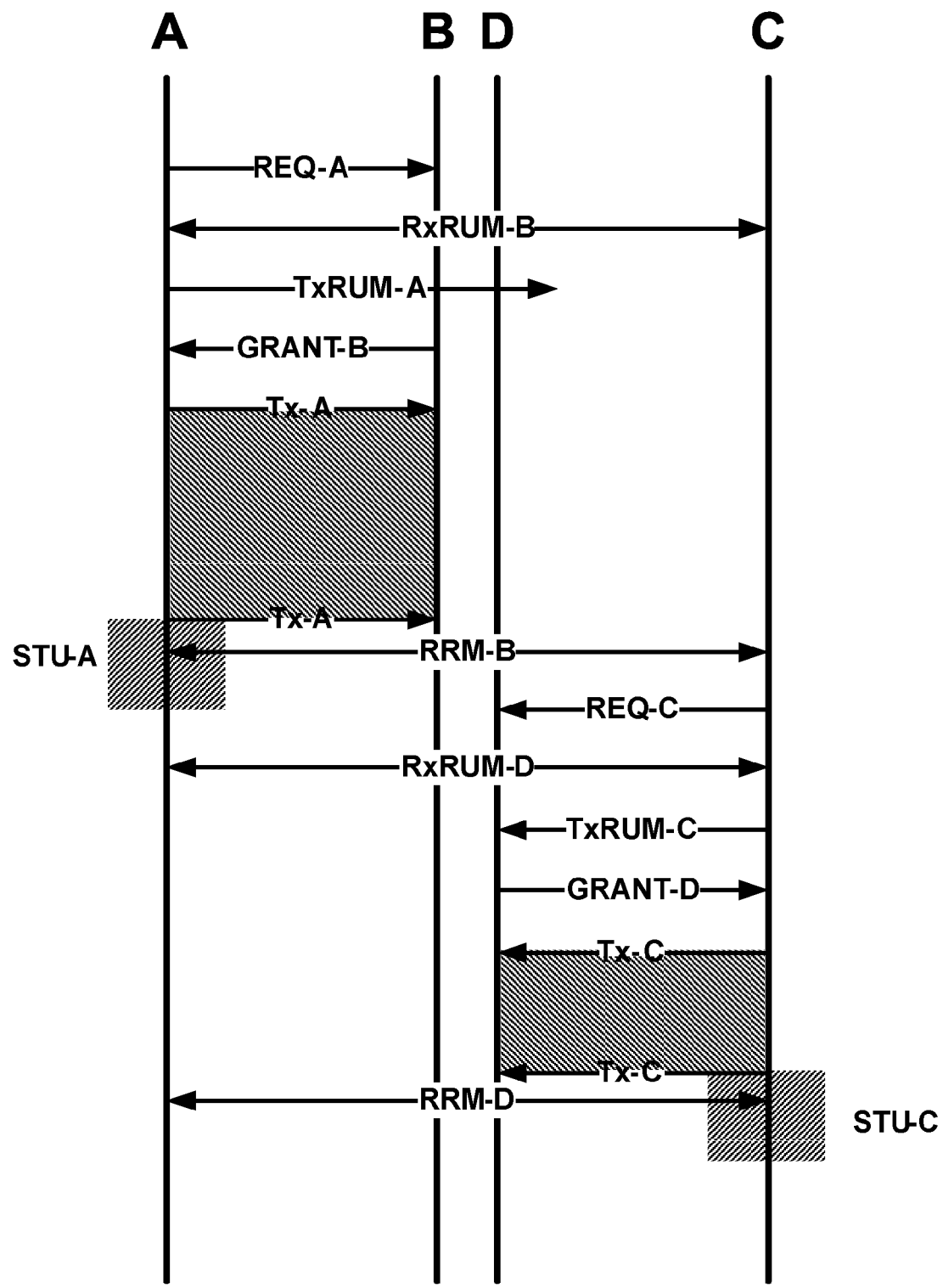
FIG. 2 is a flow diagram illustrating several sample aspects of a resource management messaging scheme.

FIG. 2 illustrates, in a simplified manner, information flow between several neighboring nodes A, B, C, and D in a communication system. Here, nodes A and B are associated with one another and nodes C and D are associated with one another. In the illustrated example, nodes A and B exchange control messages to enable node A to send data to node B. Similarly, nodes C and D exchange control messages to enable node C to send data to node D. Thus, nodes A and C may comprise transmitting nodes and nodes B and D may comprise receiving nodes in the discussion that follows.

In some aspects, the communication between nodes A and B may be asynchronous to the communication between nodes C and D. To manage interference that may occur when these nodes are accessing the same resource (e.g., channel), the receiving nodes may transmit control messages (e.g., broadcast a RUM) to neighboring transmitting nodes in an attempt to clear interference from the resource. In addition, the receiving nodes may transmit other control messages (e.g., broadcast a resource release message) to let the neighboring nodes know when the resource is no longer being used. In other words, the resource release message announces the end of a transmission that was protected by a RUM.

Reference will initially be made to the messages generated by nodes A and B. As long as it is not blocked by an active RUM from a receiving node (e.g., as discussed in more detail below), node A transmits (e.g., unicasts) a request message REQ-A to node B to initiate a data transmission session with node B. In some aspects, this request message may include an indication regarding the amount of data to be sent to node B (e.g., the size of the outstanding buffer).

In response to this request, node B may transmit a RUM (designated in FIG. 2 as a receive RUM, "RxRUM") if it is experiencing interference during its receive operations. In some aspects, the RxRUM-B may comprise a request from node B to its neighboring nodes to reduce interference on a resource (e.g., a resource designated by the RxRUM). An RxRUM may be defined such that it expires after a given period of time (e.g., a time-to-live time period).

Nodes that wish to schedule upcoming transmissions are configured to monitor for such RxRUMs from neighboring nodes. As represented by the arrowed lines associated with the RxRUM-B, nodes A and C receive RxRUM-B. In the event a transmitting node (e.g., node A and/or node C) receives RxRUMs from more than one receiving node, the transmitting node may resolve contention between these RxRUMs (e.g., based on priorities associated with the RxRUMs as discussed below). In the example of FIG. 2, its is assumed no other receiving nodes have sent an RxRUM having a higher priority than RxRUM-B. Consequently, node A may transmit (e.g., broadcast) a RUM (designated as a transmit RUM, "TxRUM," in FIG. 2) to inform neighboring nodes that its receiving node (node B) has won the current contention. As represented by the arrowed line associated with TxRUM-A, nodes B and D receive TxRUM-A, but node C does not. Nevertheless, since node C received RxRUM-B, node C may determine that RxRUM-B has the highest priority and may therefore elect to limit its transmissions on the designated resource as long as RxRUM-B is active.

Upon receipt of TxRUM-A, node B may transmit (e.g., unicast) a grant message to node A, informing node A that node B has scheduled the transmission. In some aspects, this grant message may specify transmission parameters such as bandwidth, transmission rate, transmission power, communication coding, number of channels, and so on, to be used during the transmission. Here, node B may select these parameters based on the current condition of the resource (e.g., interference measured by node B).

Upon receipt of this grant message (e.g., GRANT-B), node A commences data transmission to node B. In FIG. 2, the corresponding transmission opportunity ("TXOP") is represented by the shaded area delineated by the Tx-A designations.

Once node A completes its transmission (e.g., at the end of node A's TXOP), node B may transmit a resource release message ("RRM") to inform neighboring transmitting nodes that node A is no longer transmitting on the resource. Thus, in some aspects, the RRM-B may serve to indicate that RxRUM-B's request for reduction in interference is now terminated. For convenience of illustration, the location of the arrowed line for RRM-B is not shown as coinciding with the end of the TXOP for node A in FIG. 2. It should be appreciated, however, that node B may transmit RRM-B immediately after this TXOP ends.

As mentioned above, a transmitting node may not receive any control messages sent by neighboring nodes when that node is transmitting. Consequently, a status update ("STU") period is defined after the TXOP to enable the node to acquire information it may have missed when transmitting. If the transmitting node has more data to send, before it attempts to transmit again, the node is configured to receive during the status update period to acquire control messages (e.g., RUMs) sent by other nodes.

Conversely, if a transmitting node does not have any more data to send, the node may simply switch to a receiving mode. Thus, the node may immediately listen for a request from an associated transmitting node and transmit RUMs over the control channel, if applicable.

In the example of FIG. 2, upon learning that the resource is now available as indicated by RRM-B, node C transmits a message ("REQ-C") requesting authorization to transmit to node D. If node D is experiencing undue interference, node D may then send a receive RUM ("RxRUM-D"), whereupon node C may send a transmit RUM ("TxRUM-C") as shown in FIG. 2. Node B may then send a grant ("GRANT-D") authorizing node C to transmit data to node B. Alternatively, in the event node D is not experiencing undue interference, node D may simply grant the request whereby the RxRUM, TxRUM, and RRM are not used.

The corresponding TXOP for node C's transmission is represented by the shaded area delineated by the Tx-C designations. Once node C completes its transmission, node D may transmit a resource release message ("RRM-D") and node C may monitor the resource during its status update period ("STU-C").

Figure 3:
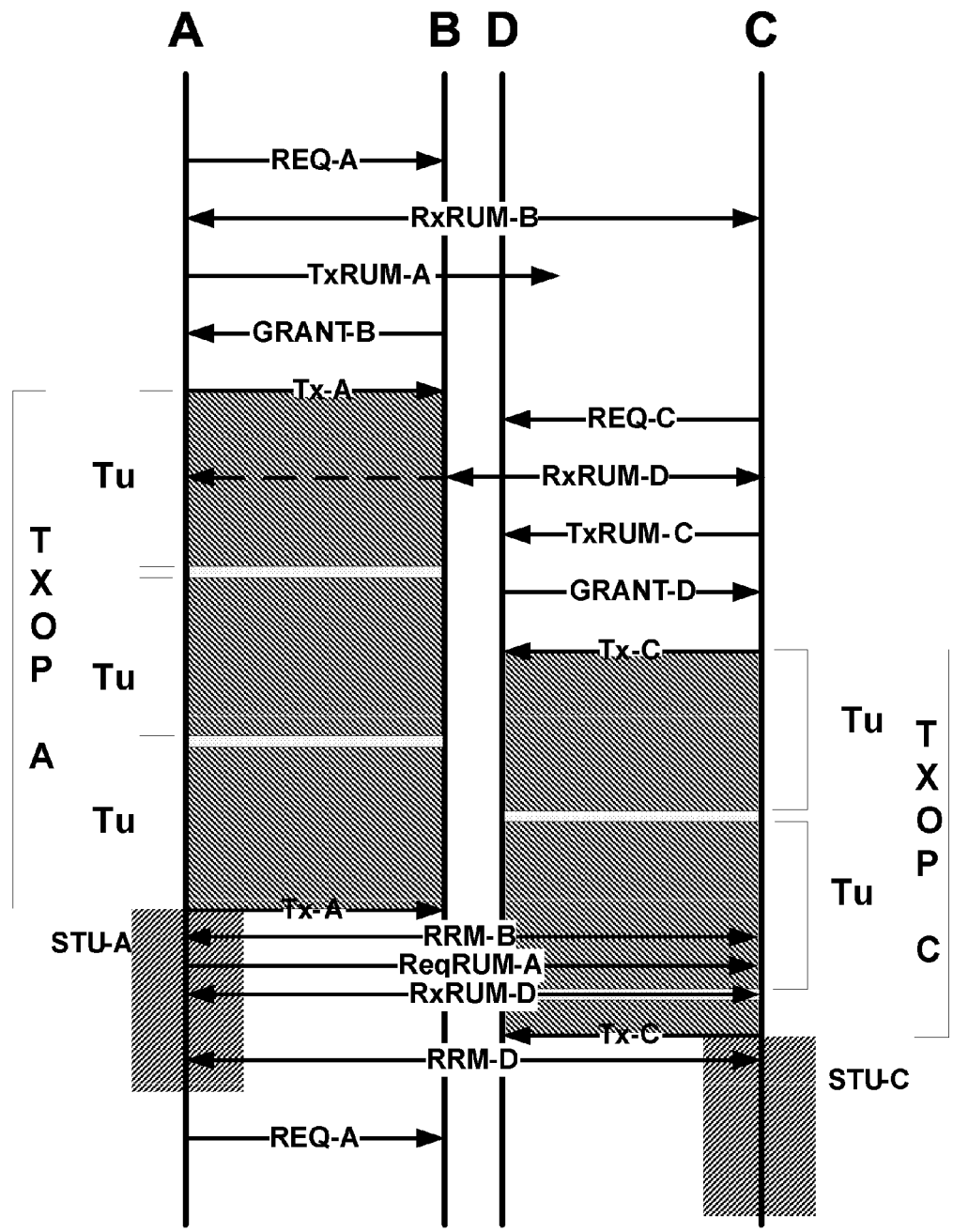
FIG. 3 is a flow diagram illustrating several sample aspects of a resource management messaging scheme.
Figure 4:
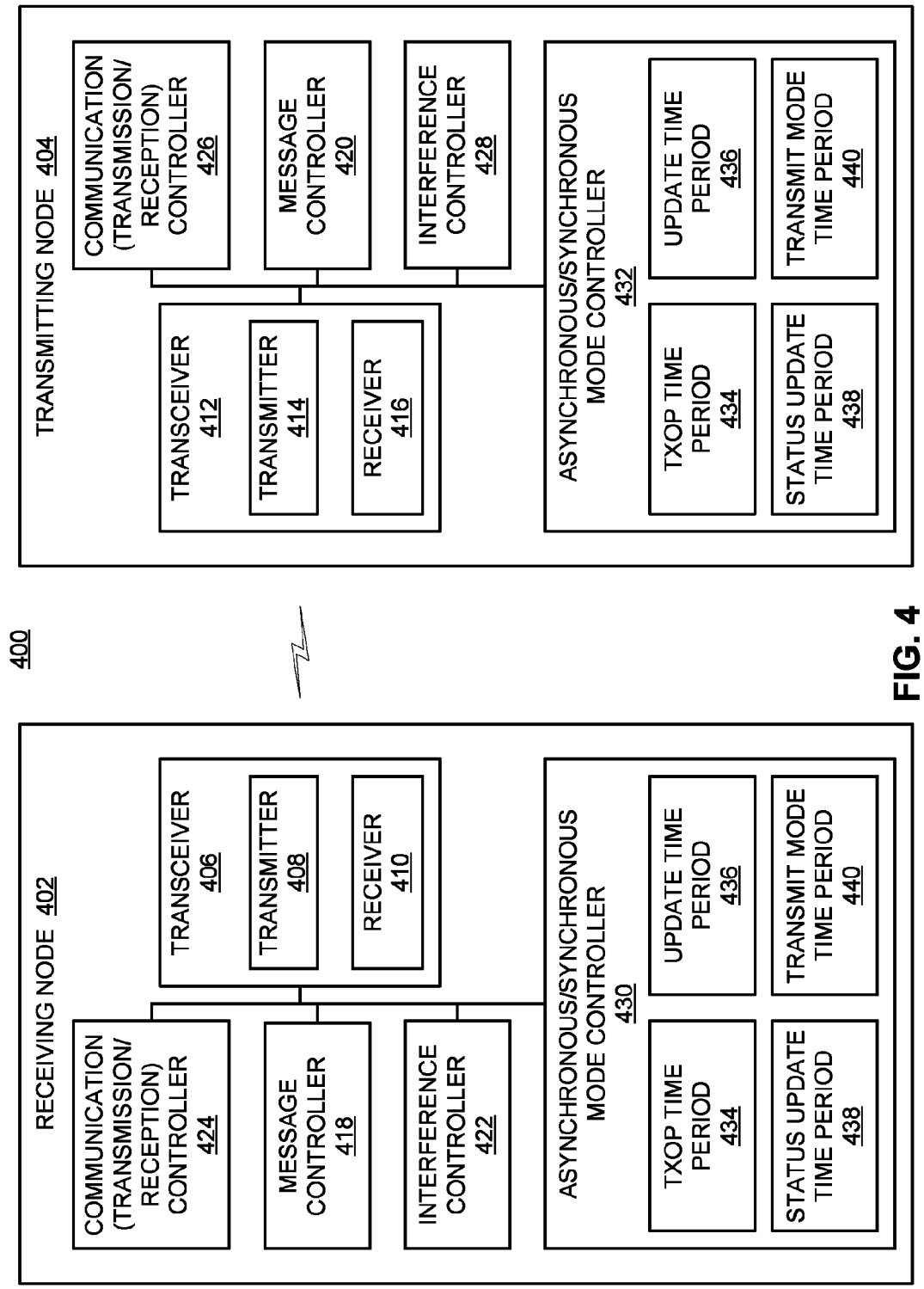
FIG. 4 is a simplified block diagram of several sample components of communication nodes.

FIG. 3 illustrates an example where nodes A and C transmit concurrently on the same resource. As described above in conjunction with FIG. 2, nodes A and B transmit control messages to establish a transmission opportunity (designated TXOP A in FIG. 3) on a designated resource.

In this example, however, node C determines that it may transmit on the designated resource concurrently with node A. For example, as will be described in more detail below, node C may determine that it will not unduly interfere with reception at node B based on information proved by RxRUM-B. Here, node C may define one or more of its transmission parameters (e.g., transmission rate, transmission power, coding, and so on) to reduce the impact its transmissions may have on reception at node B.

In a similar manner as described above in conjunction with FIG. 2, nodes C and D may transmit control messages REQ-C, RxRUM-D, TxRUM-C, and GRANT-D to establish a transmission opportunity (designated TXOP C) on the designated resource. The grant from node D may take into account (e.g., when defining transmission parameters) any interference that node A is causing at node D. In this case, node A will not "hear" RxRUM-D because node A is transmitting when node D transmits RxRUM-D. RxRUM-D may still be useful, however, to contend against other nodes for the resource.

FIG. 3 illustrates how a request RUM ("ReqRUM") control message and several defined time periods may be used to enable a node that has been transmitting (and, hence, not receiving control messages) to acquire information from neighboring nodes. As mentioned above, the status update period relates to a designated period of time after completion of a TXOP during which a transmitting node will abstain from transmitting. Specifically, a transmitting node that wishes to continue transmitting will monitor for control messages (e.g., RxRUMs) from neighboring nodes during this time period to determine whether it should limit its transmission to avoid interfering with reception at the neighboring nodes.

Update periods (designated "Tu" in FIG. 3) also may be defined within each TXOP to enable a receiving node to periodically transmit control messages. For example, at regular intervals based on Tu, a transmitting node (e.g., node A) will stop transmitting for a defined period of time (e.g., the gap between adjacent Tu time periods in FIG. 3). Concurrently, the receiving node (e.g., node B) associated with that transmitting node may switch to a transmit mode during the defined period of time. For example, a receiving node may transmit an RxRUM during this time period if the receiving node received a ReqRUM during the preceding Tu period. In this way, a receiving node may be configured to transmit an RxRUM within a defined period of time (e.g., based on Tu) after receiving a ReqRUM.

Referring again to the message flow of FIG. 3, once node A completes its transmission for its TXOP A, node A will transmit a ReqRUM if it has more data to send. In some cases, node A's transmission of ReqRUM-A will commence the running of the status update period STU-A. For convenience of illustration, however, the location of the arrowed line for ReqRUM-A is not shown as coinciding with the beginning of STU-A in FIG. 3.

Since node D is receiving data from node C at this time, node D may receive ReqRUM-A. Node D may not immediately respond to the ReqRUM, however, because this may cause node D to miss a transmission from node C. Instead, node D waits to transmit its RxRUM-D during the defined transmit mode time period following the current update period (i.e., following the second Tu period in TXOP C). Note that node D did not transmit an RxRUM-D during the previous transmit mode time period since node D did not receive a ReqRUM during the preceding update period (i.e., the first Tu period in TXOP C).

By defining the status update period STU-A based on the length of Tu, node A may be assured of receiving RxRUM-D during STU-A. For example, STU may be defined as the Tu time period plus the transmit mode time period plus a time margin.

In the example of FIG. 3, node A elects to limit its transmission based on the information provided by RxRUM-D. For example, the priority of RxRUM-B may now be lower due to better quality of service at node B. Later, after receiving RRM-D indicating that node C is no longer transmitting on the resource, node A may send a request to node B to restart its transmit operations.

In the above scenario, node C's transmission to node D may have some effect on the interference environment at node D even though node C has determined that its transmissions will not result in an unacceptable level of interference at node D. To address this situation, nodes A and B may change and/or confirm their current transmission parameters (e.g., the rate assignment) following every update period interval Tu (e.g., during the transmit mode time period during which RxRUM may be rebroadcast). This may be accomplished, for example, by the receiving node transmitting updated grant messages.

In some aspects, a TXOP may be defined as the longest continuous time a node may transmit on a resource before pausing to see if any other nodes want to use the resource. TXOP may thus provide a lower bound on the minimum latency that may be supported by the system. TXOP also may provide an upper bound on maximum one-directional time sharing. For example, a node may transmit for a fraction of time up to 1−Tu/(Tu+TXOP). The remaining time may then be utilized to receive traffic in the other direction. In some aspects, time sharing on the resources may be controlled. For example, variable time sharing may be provided on different parts of a network by using different TXOP values on different resources (e.g., links) and/or for different nodes.

TXOP also may define the longest time that a transmitting node may need to wait before its request is heard by its intended receiving node (e.g., that may be busy transmitting). In such a case, the requesting node may keep sending requests until it succeeds in establishing a transmission.

When a receiving node transmits an RxRUM in an attempt to restrict an ongoing transmission by a non-associated transmitting node, the receiving node may only need to wait for up to a TXOP time before the RxRUM is heard by the non-associated transmitting node. For example, the transmitting node associated with the receiving node may receive the resource release message associated with the on-going transmission and then transmit a TxRUM. Alternatively, the transmitting node associated with the receiving node may send the TxRUM immediately. In this case, the receiving node may delay the grant (as discussed below) until the on-going transmission terminates.

A resource management messaging scheme as described above may facilitate effective asynchronous communication. For example, fairness between nodes contending for a resource may be achieved through the use of priorities associated with the RUMs. Such a scheme may provide efficient spectrum reuse since nodes may transmit concurrently. For example, a node may elect to ignore RUMs if it is not causing unacceptable interference (e.g., as indicated by the carrier-to-interference ratio) at the RUM-sending nodes. In addition, such a scheme may provide effective interference management even when the nodes have different transmit power (e.g., through the use of RUMs that have a longer range than the data transmissions).

Figure 5:
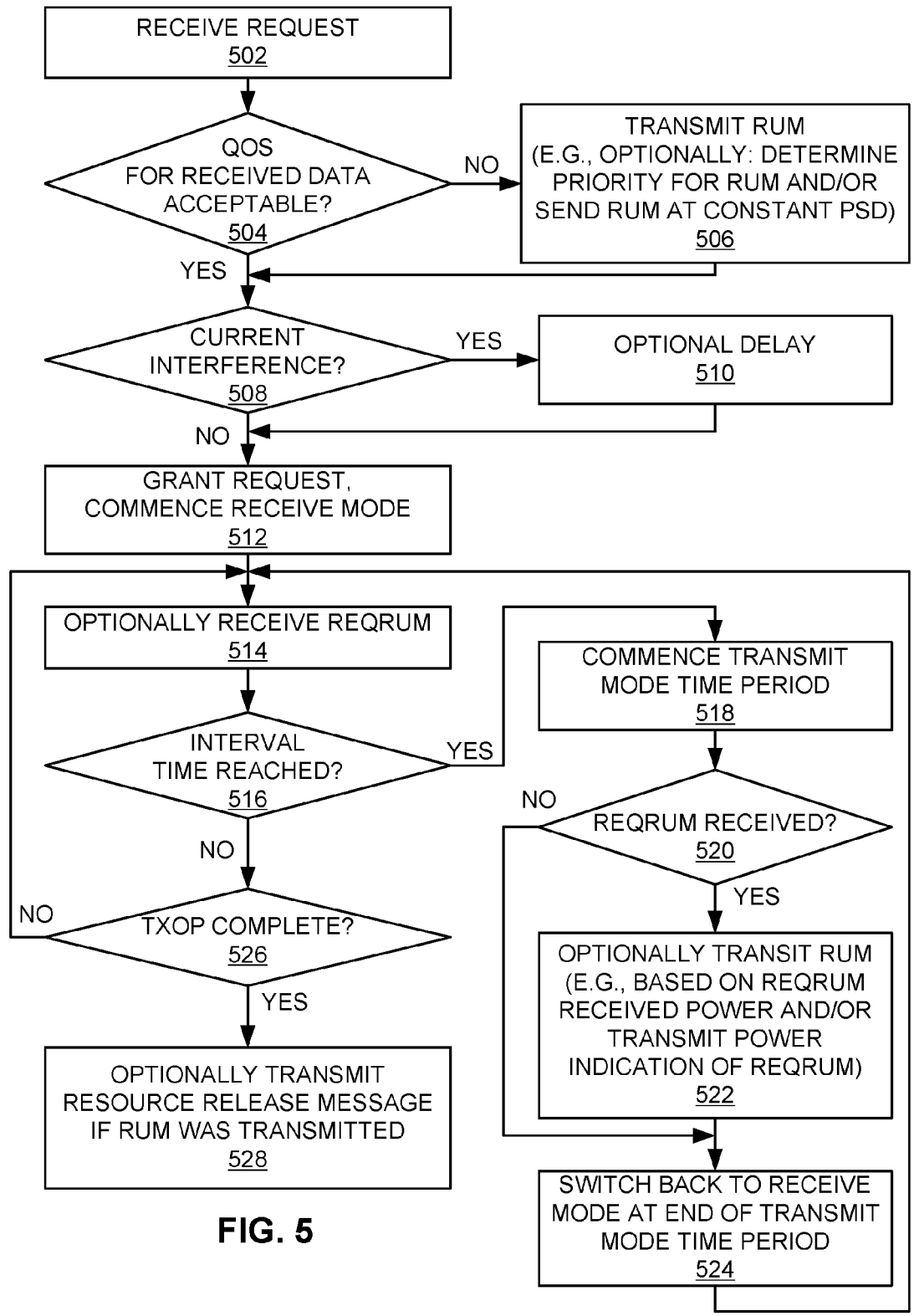
FIG. 5 is a flowchart of several sample aspects of operations that may be performed by a receiving node.
Figure 6:
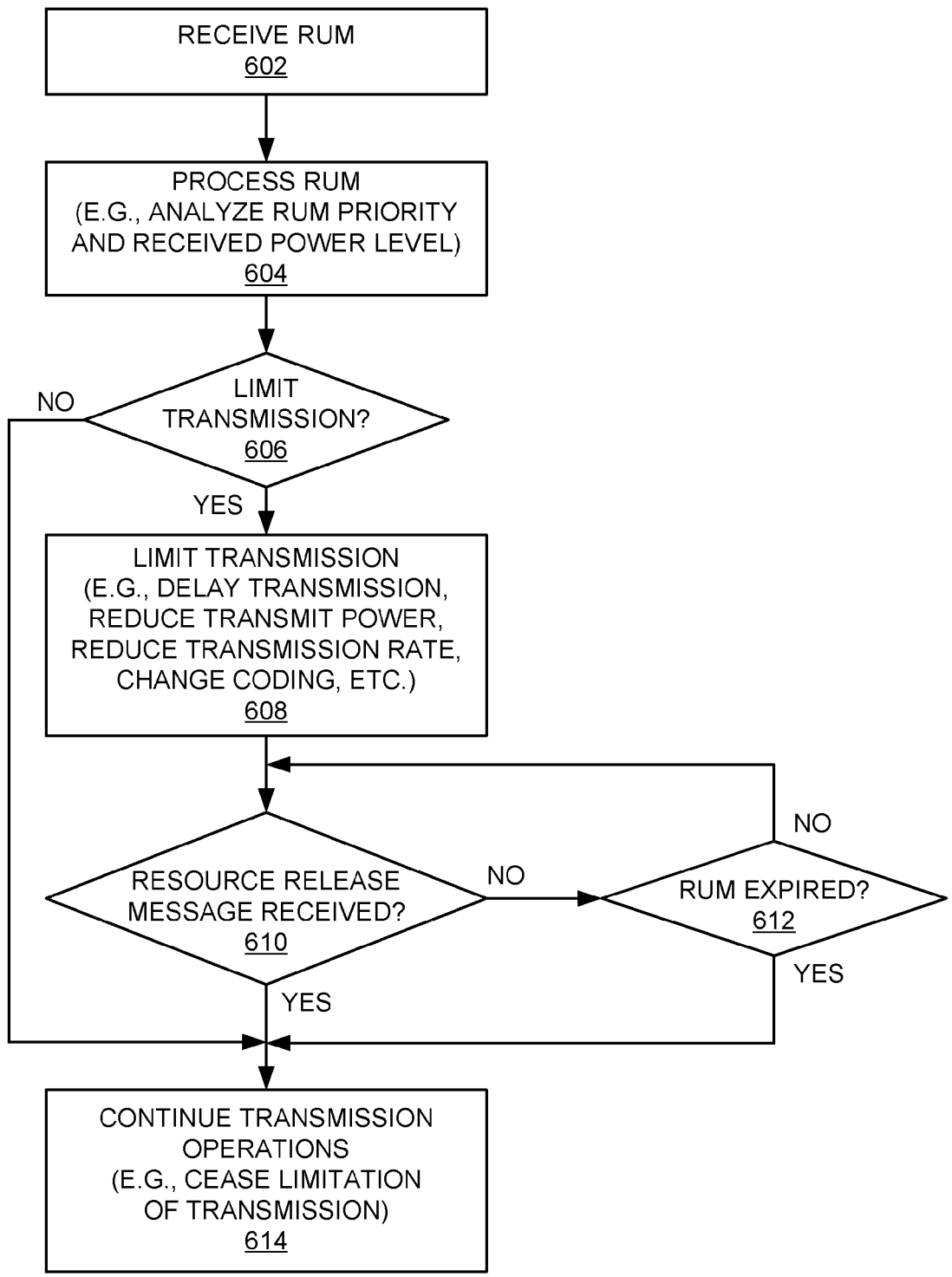
FIG. 6 is a flowchart of several sample aspects of operations that may be performed by a transmitting node.
Figure 7:
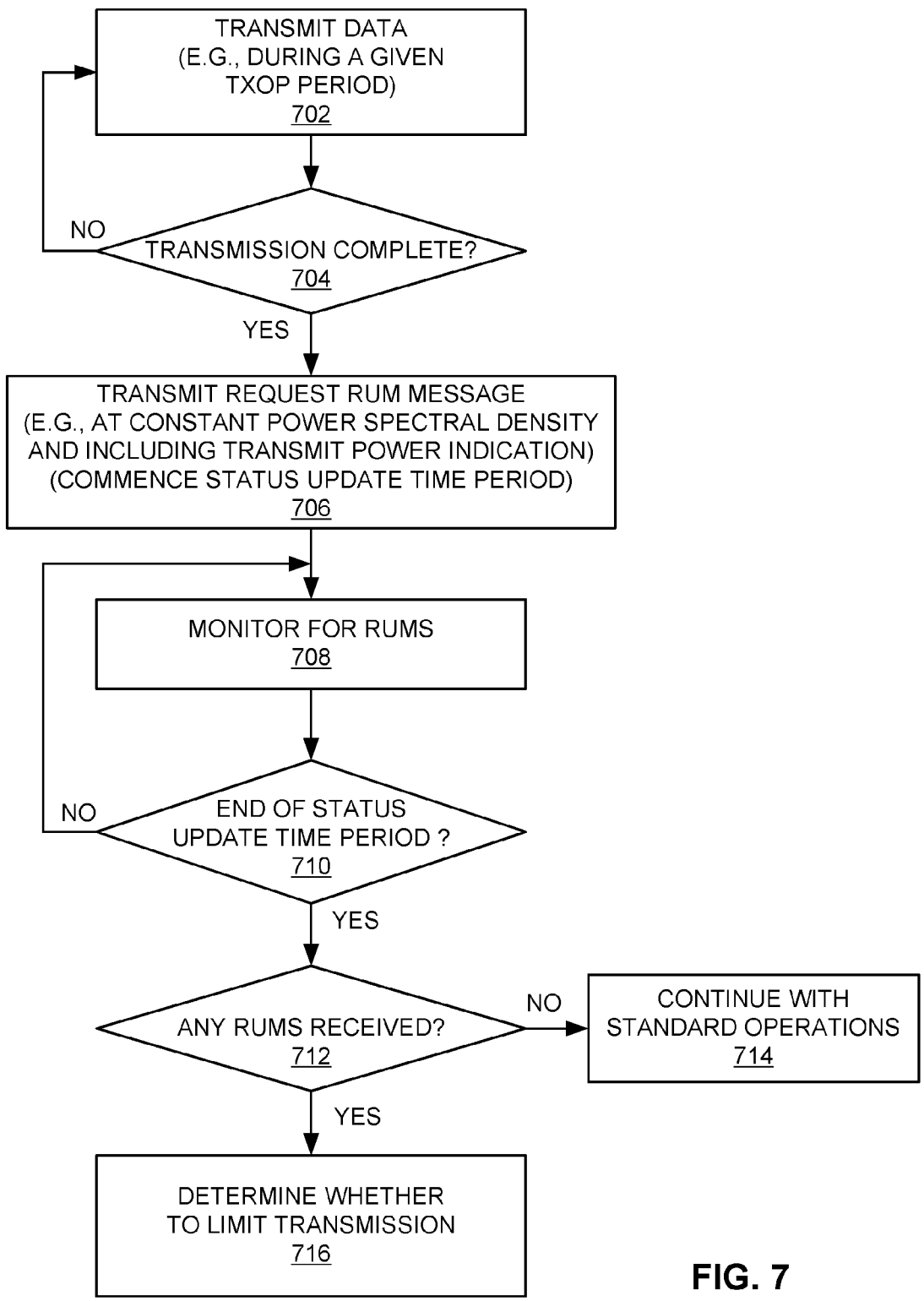
FIG. 7 is a flowchart of several sample aspects of operations that may be performed by a transmitting node.
Figure 8:
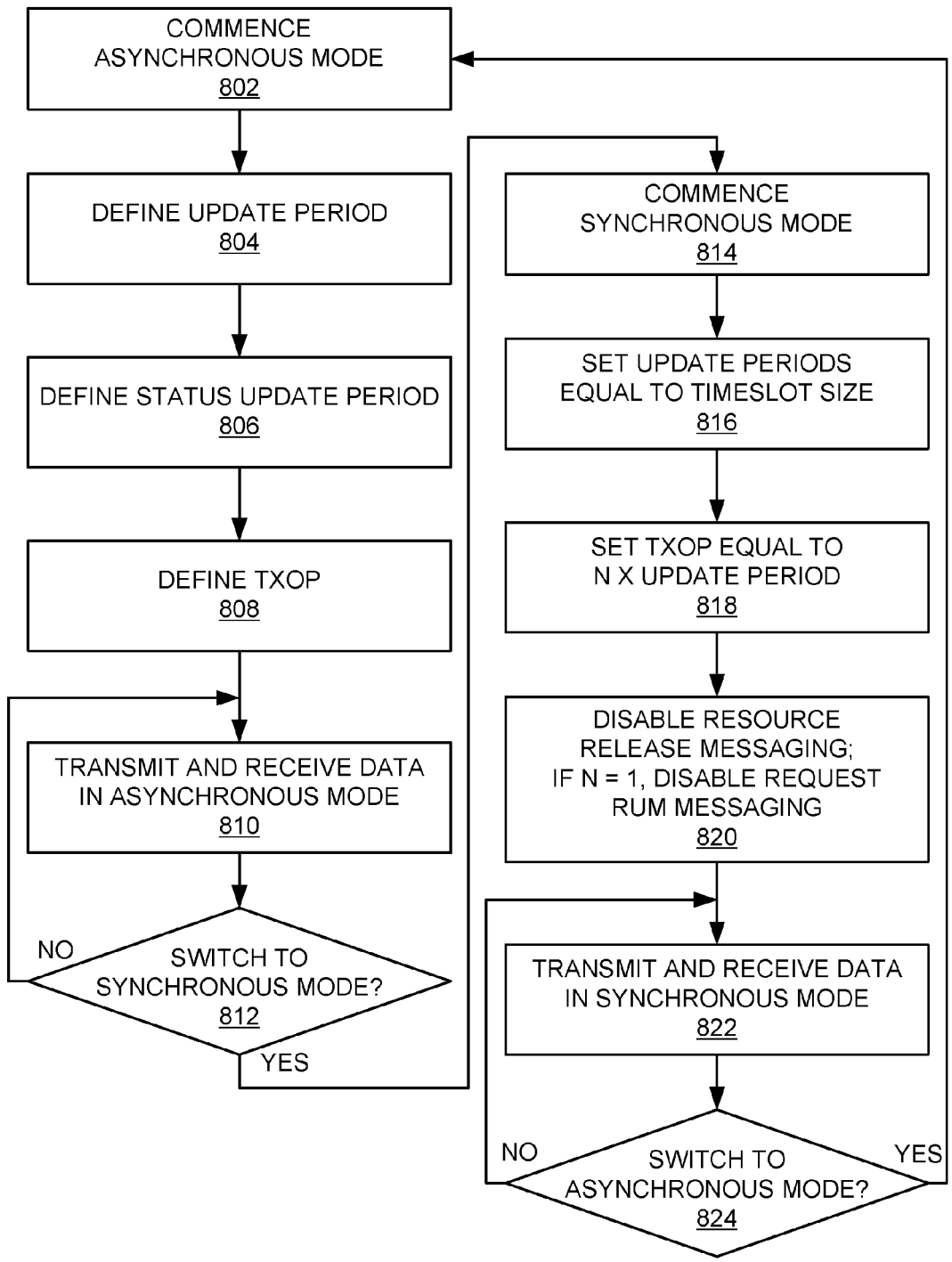
FIG. 8 is a flowchart of several sample aspects of operations that may be performed in conjunction with switching between an asynchronous mode and a synchronous mode.

With the above overview in mind, sample implementation details and other aspects of the disclosure will now be described with reference to FIGS. 4-8. Briefly, FIG. 4 depicts a communication system including a pair of nodes 402 and 404. FIG. 5 describes sample operations that may be performed by a receiving node (e.g., an access point or an access terminal). FIGS. 6 and 7 describe sample operations that may be performed by a transmitting node (e.g., an access point or an access terminal). FIG. 8 describes sample operations that may be performed to switch between asynchronous communication and synchronous communication.

Referring initially to FIG. 4, for illustration purposes the node 402 describes several sample components of a receiving node and the node 404 describes several sample components of a transmitting node. For example, the node 402 may represent node B of FIG. 3 in some of the discussions that follow and may represent node D in other discussions. Similarly, the node 404 may represent node A in some discussions and node C in other discussions. It should be appreciated that any functionally described as being performed by node 402 or by node 404 may, in practice, be incorporated into a given node (e.g., node 104B of FIG. 1) for performing transmitting node operations and receiving node operations at that node. Also, in some cases a node may employ common components (e.g., a common transceiver) for providing such transmit and receive functionality.

The nodes 402 and 404 include various components for communicating with other nodes. For example, a transceiver 406 of the node 402 includes a transmitter 408 and a receiver 410. In addition, a transceiver 412 of the node 404 includes a transmitter 414 and a receiver 416. The nodes 402 and 404 also include respective message controllers 418 and 420 for generating messages to be sent to another node via a transmitter and for processing messages received from another node via a receiver. Other components of the nodes 402 and 404 will be described in conjunction with the discussion of FIGS. 5-8 that follows.

As represented by block 502 of FIG. 5, at some point in time a receiving node receives a request to transmit from an associated transmitting node. In FIG. 3, this operation may correspond to, for example, node C sending REQ-C to node D.

As represented by block 504, the receiving node may repeatedly (e.g., continually, periodically, etc.) monitor quality of service associated with data it receives from an associated transmitting node. Here, a desired level of quality of service may relate to throughput (e.g., for full buffer traffic), latency (e.g., for voice traffic), average spectral efficiency, minimum carrier-to-interference ratio ("C/I"), or some other suitable metric or metrics. For example, it may be desirable for a node to receive data associated with a given type of traffic at or above a given throughput rate (e.g., for video traffic), within a given latency period (e.g., for voice traffic), or without significant interference.

In the example of FIG. 4, the receiving node 402 includes an interference controller 422 that may be configured to analyze data received by the receiver 410 to determine one or more quality of service-related parameters associated with the data. Accordingly, the receiving node 402 may calculate throughput of received data, calculate latency of received data, some other parameter, or some combination of these parameters. In addition, the interference controller 422 may estimate of the amount of interference imparted on the received data. It should be appreciated that the interference controller 422 may take other forms and that various techniques may be employed to monitor quality of service. For example, in some implementations a node may employ a sliding window scheme (e.g., a short term moving average) to monitor the level of quality of service of its received data on a relatively continual basis.

In some aspects, a determination of whether a given level of quality of service is being achieved may be based on comparison of the quality of service information provided by the interference controller 422 with information representative of a desired quality of service (e.g., a quality of service threshold). For example, the interference controller 422 may generate a quality of service metric that indicates (e.g., provides an estimate of) the level of quality of service that is associated with received data over a given time period, a given number of packets, and so on. In addition, one or more thresholds (e.g., a RUM sending threshold) may define an expected quality of service level for a given type of traffic or for several different types of traffic. The interference controller 422 may thus compare the current quality of service metric with a quality of service threshold to determine whether the desired quality of service is being met at block 504.

In the event the monitored quality of service falls below a desired quality of service level (e.g., due to interference from a non-associated transmitting node), the receiving node may transmit a RUM in an attempt to reserve the resource on which it receives data (block 506). That is, in some aspects the RUM comprises an interference management message that requests a reduction in interference on the resource to thereby improve the quality of service of the receiving node's received data. In the example of FIG. 4, the message controller 418 may cooperate with the transmitter 408 to generate and transmit the RUM (and other control messages described herein).

In conjunction with generating a RUM, the receiving node may determine a RUM priority that indicates, for example, the degree to which the receiving node is disadvantaged. Priority information associated with a RUM may take various forms. For example, in some cases priority information may take the form of a weighting factor (e.g., a weight indication that is included in the RUM). In some implementations a RUM weight may be defined as a quantized value of a ratio of the desired quality of service (e.g., corresponding to a RUM-sending threshold) and a quality of service metric relating to the quality of service that is actually achieved. Such a weighting factor may be normalized to reduce its overhead. For example, a weight may be represented by a few bits (e.g., two or three bits). In some cases, priority may be indicated by the ordering of RUMs (e.g., in time and/or frequency). For example, RUMs occurring earlier in time may be associated with a higher priority. Thus, in some cases the receiving node may convey priority information by the manner in which a RUM is transmitted.

In some aspects a RUM may be used to mitigate (e.g., clear) interference on one or more carriers. For example, in some cases each RUM relates to a single carrier (e.g., associated with a given frequency band). In these cases, the wireless node may transmit a RUM whenever the node wishes to clear interference on that carrier. In other cases, each RUM may relate to a set of carriers. For example, in some multi-carrier systems a wireless node may transmit a RUM whenever it wishes to clear interference on all of the carriers. In other multi-carrier systems a RUM may be used to clear a subset of the available carriers. For example, when a wireless node wishes to clear interference on a subset of the carriers, the wireless node may transmit a RUM in conjunction with an indication of the carrier(s) to which the RUM applies. In such a case, the carrier indication may be included in the RUM.

A carrier indication may take various forms. For example, in some cases the carrier indication may take the form of a set of bits where each bit corresponds to a branch of a tree, and where each branch corresponds, in turn, to a carrier. For example, one bit may correspond to a first carrier, another bit may correspond to a set of carriers (e.g., which may include one or more carriers or sets of carriers). In other cases, the carrier indication may take the form of a bit mask. For example, each bit of the mask may correspond to a unique one of the carriers.

A RUM may take various forms. For example, in some cases a RUM may consist of a series of tones. In some cases different tones may cover different frequency bands. In some cases the RUMs from different nodes may be ordered in some manner (e.g., in time and/or frequency).

A RUM may be transmitted in various ways. In some cases a RUM may be broadcast. In some cases a RUM may be transmitted at a known (e.g., constant) power level (e.g., power spectral density). In some cases a RUM may be sent over one or more frequency division multiplexed channels (e.g., frequency multiplexed with respect to one or more data channels).

As represented by blocks 508 and 510, in some cases a receiving node (e.g., the message controller 418) may elect to delay issuance of a grant based on its knowledge of current transmissions and/or the interference environment at the receiving node. For example, when the receiving node receives a transmit RUM from its transmitting node (e.g., TxRUM-C) indicating that the receiving node has won contention for a resource, the interference controller 422 may determine whether the receiving node is currently experiencing a relatively high level of interference as a result of ongoing transmissions by neighboring nodes. If so, at block 510 the receiving node may elect to delay granting the transmission request until the interference subsides (e.g., but not more than a TXOP time period). Here, since the RxRUM associated with the receiving node does have the highest priority, there should not be any other interfering nodes that commence transmitting during this delay.

During this delay period the transmitting node (e.g., node C) associated with the receiving node may continue to monitor for control message (e.g., RUMs). Thus, in the event any higher priority RUMs are received during this delay period, the transmitting node may elect to defer its transmission until each higher priority RUM expires or the resource is released. Alternatively, the transmitting node and its associated receiving node may take any intervening messages into account when selecting transmission parameters for their TXOP.

As represented by block 512, once the receiving node determines that it will schedule the request, the receiving node transmits a grant message (e.g., GRANT-D) and commences its receive mode for the corresponding TXOP (e.g., TXOP C). As mentioned above, a grant message may include various transmission parameters that are specified by the receiving node based on, for example, the receiving node's analysis of current channel conditions. Upon receipt of the grant message, the associated transmitting node may commence transmitting data to the receiving node.

As represented by block 514, the receiving node may receive a ReqRUM (e.g., ReqRUM-A) when it is receiving data from its transmitting node. As represented by block 516, the receiving node may continue to receive data until the next designated time interval for switching to a transmit mode (e.g., as determined by a communication controller 424). As represented by block 518, once this time interval is reached, the transmit mode time period commences. During this time period the receiving node may switch to a transmitting mode of operation. For example, in FIG. 4 the communication controller 424 may reconfigure the transceiver 406 to transmit instead of receive. As mentioned above, the associated transmitting node also ceases its transmission operations during this time period. Thus, in the example of FIG. 4, a communication controller 426 of the node 404 may reconfigure the transceiver 412 to receive instead of transmit.

As represented by blocks 520 and 522, in the event a ReqRUM was received, the receiving node (e.g., the communication controller 424) determines whether to send a RUM in response to the ReqRUM. Here, a determination of whether to send a RUM may involve determining whether transmissions from the RUM-requesting node (e.g., node A) will unduly interfere with reception at the receiving node.

For example, the transmitting node may transmit a ReqRUM at a known power level (e.g., a constant power spectral density). In addition, the ReqRUM may be transmitted over a control channel that has a relatively low reuse factor (e.g., 1/10 or less) so that a ReqRUM transmission tends to experience a noise-limited channel as opposed to an interference-limited channel. As a result, the received signal strength of the ReqRUM may be proportional to the signal-to-noise ratio, whereby the receiving node may determine the path loss to the RUM-requesting node by, for example, measuring the power of the received ReqRUM (e.g., at the receiver 410). Based on this path loss information and the knowledge about the transmit power of the transmitting node (e.g., as provided by a transmit power indication included in the ReqRUM), the receiving node may estimate the level of interference a transmission by the RUM-requesting node will cause at the receiving node. If this interference level is relatively high (e.g., is greater than or equal to a defined threshold interference level) the receiving node may elect to transmit a RUM. Otherwise, the receiving node may elect to ignore the ReqRUM.

As represented by block 524, at the end of the transmit mode time period, the receiving node switches back to a receive mode of operation and continues receiving data from the transmitting node. Thus, in the example of FIG. 4, the communication controller 424 may reconfigure the transceiver 406 to receive instead of transmit and the communication controller 426 may reconfigure the transceiver 412 to transmit instead of receive.

As represented by block 526, the operations of blocks 514-524 may be repeated, if applicable, until the TXOP terminates. Here, TXOP may be terminated, for example, upon expiration of a defined maximum TXOP time period or at some earlier time if the transmitting node has no more data to send.

As represented by block 528, the receiving node may then optionally transmit a resource release message to inform neighboring nodes that the previously reserved resource is no longer being used. For example, the receiving node may transmit a resource release message any time the TXOP is shorter than the maximum TXOP time period.

Referring now to FIG. 6, several operations that may be performed by a transmitting node will now be treated. In particular, the operations of FIG. 6 relate to receiving one or more RUMs and, optionally, a resource release message (e.g., transmitted by a receiving node as described above at FIG. 5).

As represented by block 602, at various points in time a transmitting node (e.g., node C) may receive RUMs from one or more neighboring receiving nodes. For example, the transmitting node may receive RUMs from one or more associated receiving nodes (e.g., node D) and/or from one or more non-associated receiving nodes (e.g., node B).

As represented by block 604, the receiving node (e.g., the message controller 420) may process information provided by the received RUMs to resolve any contention between the received RUMs for the use of a resource (e.g., a given carrier) based on the priorities associated with the RUMs. For example, if several nodes send RUMs for the same resource, the node that sent the RUM associated with the highest priority may be given priority to use the resource.

As represented by block 606, the transmitting node (e.g., the communication controller 426) may then determine whether to limit its transmission in response to a received RUM. Here, the neighboring interfering nodes (e.g., node A) may limit their transmissions since their associated receiving nodes (e.g., node B) did not win the contention for the resource. Since these interfering nodes will be cleared off the resource, the transmitting node will be free to transmit to its receiving node using the resource once it is scheduled to do so (e.g., by an access point). In this case, the operational flow may proceed to block 614.

Conversely, in the event a receiving node associated with the transmitting node did not transmit a RUM or did not transmit a RUM having the highest priority, the transmitting node may determine whether its transmission will interfere with reception at the RUM-sending node that sent the highest weight RUM. In some aspects, this determination may involve comparing a RUM rejection threshold with a value associated with (e.g., derived from) the received RUM. In other words, the transmitting node may elect to obey or ignore the RUM depending on whether this value is less than, greater than, or equal to the threshold. For example, the RUM rejection threshold may be defined as a value that represents the maximum allowable level of interference at the RUM-sending node (e.g., node B). In this case, the transmitting node (e.g., an interference controller 428) may estimate the amount of interference a transmission from transmitting node would cause at the RUM-sending node. The transmitting node may then compare this interference estimate with the RUM rejection threshold.

Such an interference estimate may be generated in various ways. For example, as mentioned above, a RUM may be transmitted at a known power level. In addition, the RUM may be transmitted over a noise-limited channel control channel as described above where the received signal strength of the RUM may be proportional to the signal-to-noise ratio. The transmitting node may thus determine the path loss to the RUM-sending node by, for example, measuring the power of the received RUM (e.g., at the receiver 416). Based on this path loss information and the known transmit power of the transmitter 414, the transmitting node may estimate the level of interference its transmission will cause at the RUM-sending node.

If the interference estimate value is less than (or less than or equal to) the RUM rejection threshold—thereby indicating that the interference will fall below a specified level—the transmitting node may elect to ignore the RUM. In this case, the operation flow may continue normal transmission operations.

Otherwise, the transmitting node may elect to limit its transmission as represented by block 608. A transmitting node may limit transmission in various ways. For example, a node may limit transmission by abstaining from transmitting during a transmission opportunity (e.g., delaying transmission by electing to transmit at a later time), reducing transmit power, reducing data transmission rate, using different coding (e.g., modifying a coding scheme), transmitting on another resource (e.g., using a different frequency carrier), performing some other suitable operation, or performing some combination of the above.

As represented by blocks 610 and 612, in the event the transmitting node elected to obey a received RUM, the transmitting node may wait until the resource is freed before commencing any further transmission operations (e.g., sending a request to transmit) on that resource. For example, as mentioned above the transmitting node may wait until it receives a resource release message (e.g., RRM-B) at block 610 or may wait until the RUM expires at block 612 (e.g., the time-to-live time period has elapsed).

As represented by block 614, the transmission controller 426 may cease limiting transmission once the RUM in no longer active. Thus, the transmitting node may continue with its transmission operations, subject to an intervening receipt of a high weight RUM from another receiving node. For example, if an RxRUM sent by its associated receiving node is pending (e.g., previously transmitted but not yet expired), the transmitting node may wait until that RxRUM has the highest priority (e.g., all other higher priority RxRUMs are no longer valid) and then send a TxRUM.

Referring now to FIG. 7, several ReqRUM-related operations that may be performed by a transmitting node will be treated. As represented by blocks 702 and 704, a transmitting node (e.g., node A) may transmit data to its associated receiving node (e.g., node B) during a given TXOP.

As represented by block 706, once the TXOP is complete, the transmitting node may transmit a ReqRUM (e.g., ReqRUM-A) to request neighboring receiving nodes to send RUMs. As mentioned above, this action may commence the status update period (e.g., STU-A). Also as mentioned above, the ReqRUM may be transmitted at a known power level and may include an indication of the transmit power the transmitting node (e.g., the transmitter 414) will use to transmit its data. Such a transmit power indication may comprise, for example, a weight field that indicates the transmit power class of the transmitting node.

As represented by blocks 708 and 710, the transmitting node (e.g., by operation of the communication controller 426 and the receiver 416) monitors the control channel for RUMs (e.g., RxRUM-D) for the entire status update period. As represented by blocks 712 and 714, if no RUMs are received during the status update period, the transmitting node may continue with its standard operations. For example, if node A has data to send to node B, node A may issue a request REQ-A in an attempt to commence this data transmission.

As represented by block 716, if one or more RUMs were received during the status update period, the transmitting node may determine whether it needs to react to (e.g., obey) the RUMs. In this case, the transmitting node may perform operations as described above in conjunction with FIG. 6.

Referring now to FIG. 8, in some aspects a node may be configured to operate in a synchronous manner or an asynchronous manner with respect to one or more neighboring nodes. For example, if an associated set of nodes is not able to acquire timing from a neighboring non-associated node, the set of nodes may initially establish communication that is not synchronized to the communication of the non-associated node. However, if the set of nodes is able to acquire such timing at a later point in time, the set of nodes may transition to a mode of operation where such communications are synchronized. To this end, the transmitting and receiving nodes 402 and 404 may include respective mode controllers 430 and 432 to facilitate switching between synchronous and asynchronous modes of operation.

The operations of FIG. 8 will be described commencing at block 802 where the nodes commence an asynchronous mode of operation. As represented by blocks 804, 806 and 808, a set of associated nodes may define several time periods for asynchronous operations. For example, at block 804 the nodes may define an update period (e.g., Tu) along with the associated transmit mode time period. At block 806 the nodes may define a status update period (e.g., STU). At block 808 the nodes may define a TXOP time period. In some aspects the definition of the time periods may involve obtaining time period information (e.g., default time periods specified by a service provider) that are stored in a data memory. For example, as shown in FIG. 4, the nodes 402 and 404 may maintain TXOP time period information 434, update time period information 436, status update time period information 438, and transmit mode time period information 440.

As represented by blocks 810 and 812, the set of nodes may continue to transmit and receive data in this asynchronous mode of operation until a decision is made to switch to a synchronous mode of operation. As mentioned above, such a decision may be made based on a determination by the mode controllers 430 and 432 that suitable timing information may be acquired for synchronous operation.

When the mode controllers 430 and 432 elect to initiate a switch to a synchronous mode of operation (block 814), this transition may be accomplished in a relatively efficient and non-intrusive manner by setting one or more of the time periods described above to values that correspond to the timeslot timing used in the synchronous mode. For example, at block 816 the update period Tu may be set equal to the size (e.g., duration) of a timeslot used for synchronous operation. In addition, at block 818, the TXOP period may be set equal to N×Tu, where N is an integer.

Also at block 820, the mode controllers 430 and 432 may disable processing relating to the transmission of certain control messages. In some aspects, status update period STU messages such as ReqRUM may be disabled since, in a synchronous operating mode, all of the RxRUMs for a given timeslot should be heard by any nodes that could interfere with that timeslot. For example, all nodes that wish to use a given timeslot may be configured to transmit their RUMs at known times (e.g., a designated number of timeslots before the timeslot being reserved).

In the case where N=1 (i.e., TXOP=Tu=timeslot size), a transmitting node will be silent for a Tu period after every TXOP. This configuration may be used for a synchronous mode of operation that uses transmit and receive timeslots of equal size. Here, a node may select the timeslots on which it will transmit or receive by sending a request message at the appropriate time. When N=1, the resource release message also may be disabled since the nodes will transmit and receive on alternating timeslots of a known duration.

In the case where N>1 (i.e., Tu=timeslot size, and TXOP=N×Tu), the TXOP size may be different for different nodes, and for different transmission opportunities. In this case, after every Tu, a transmitting node may pause to listen for any new RxRUMs. In addition, a resource release message may be transmitted at the end of the TXOP to enable previously blocked nodes to use the resource. Here, a node that wants a repeated TXOP (e.g., repeated access to a resource) may be configured to wait one timeslot before attempting to use the resource again.

If a transmitting node receives a RUM with a higher priority (e.g., weight component), the node may cease its transmission to allow the higher priority transmission to have access to the resource. In such a case, since the receiving node associated with that transmitting node will no longer receive data, the receiving node may send a new RxRUM (e.g., with a higher priority) and wait for a new TxRUM in response.

As represented by blocks 822 and 824 of FIG. 8, the set of nodes may continue to transmit and receive data in this synchronous mode of operation until a decision is made to switch to an asynchronous mode of operation. Such a decision may be made based, for example, on a determination by the mode controllers 430 and 432 that timing information necessary for synchronous operation has been lost.

Figure 9:
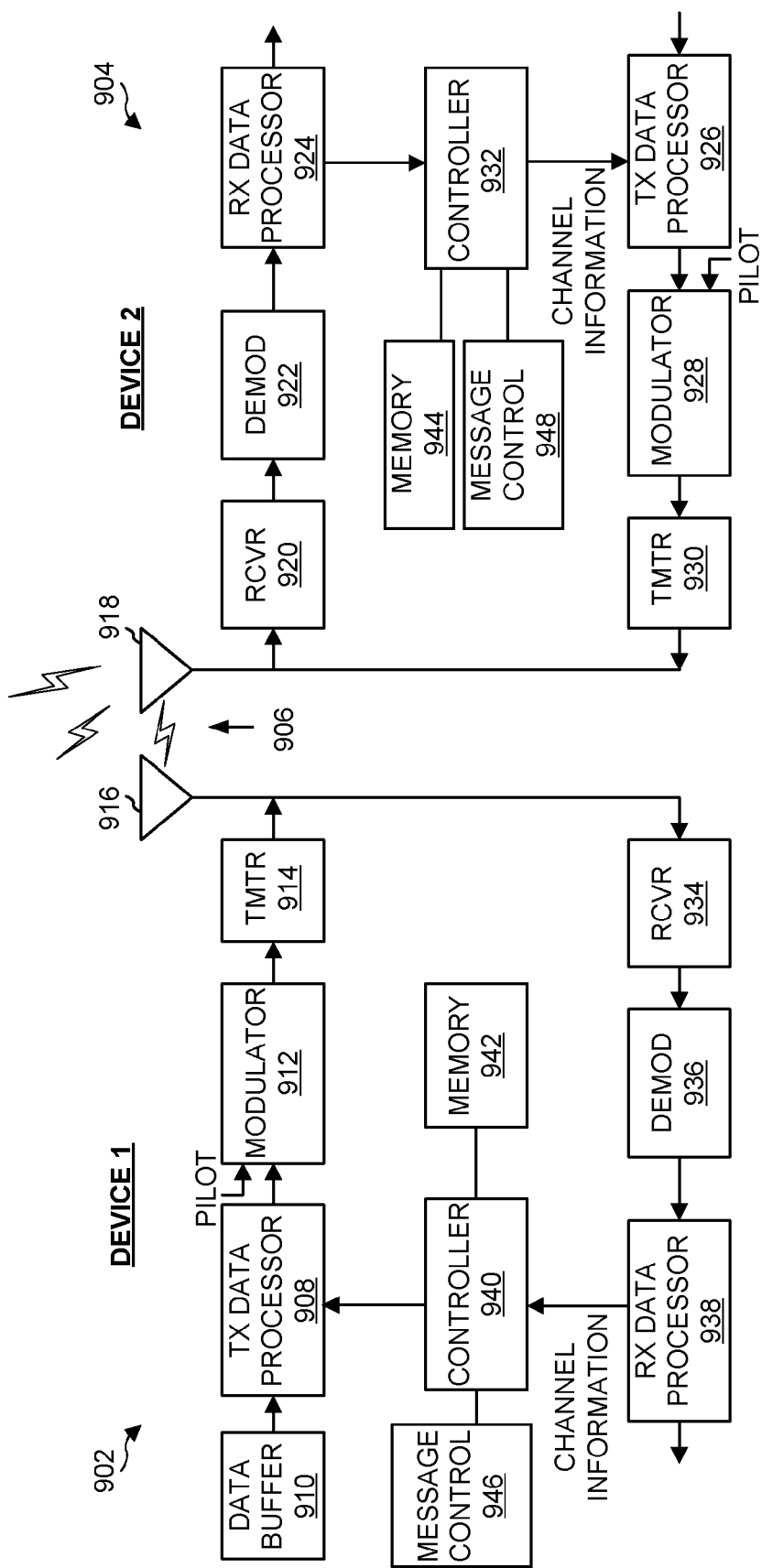
FIG. 9 is a simplified block diagram of several sample aspects of communication components.

The teachings herein may be incorporated into a device employing various components for communicating with at least one other wireless device. FIG. 9 depicts several sample components that may be employed to facilitate communication between devices. Here, a first device 902 (e.g., an access terminal) and a second device 904 (e.g., an access point) are configured to communicate via a wireless communication link 906 over a suitable medium.

Initially, components involved in sending information from the device 902 to the device 904 (e.g., a reverse link) will be treated. A transmit ("TX") data processor 908 receives traffic data (e.g., data packets) from a data buffer 910 or some other suitable component. The transmit data processor 908 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 912 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 914 processes (e.g., converts to analog, filters, amplifies, and frequency upconverts) the output chip stream and generates a modulated signal, which is then transmitted from an antenna 916.

The modulated signals transmitted by the device 902 (along with signals from other devices in communication with the device 904) are received by an antenna 918 of the device 904. A receiver ("RCVR") 920 processes (e.g., conditions and digitizes) the received signal from the antenna 918 and provides received samples. A demodulator ("DEMOD") 922 processes (e.g., demodulates and detects) the received samples and provides detected data symbols, which may be a noisy estimate of the data symbols transmitted to the device 904 by the other device(s). A receive ("RX") data processor 924 processes (e.g., symbol demaps, deinterleaves, and decodes) the detected data symbols and provides decoded data associated with each transmitting device (e.g., device 902).

Components involved in sending information from the device 904 to the device 902 (e.g., a forward link) will be now be treated. At the device 904, traffic data is processed by a transmit ("TX") data processor 926 to generate data symbols. A modulator 928 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 930 and transmitted from the antenna 918. In some implementations signaling for the forward link may include power control commands and other information (e.g., relating to a communication channel) generated by a controller 932 for all devices (e.g. terminals) transmitting on the reverse link to the device 904.

At the device 902, the modulated signal transmitted by the device 904 is received by the antenna 916, conditioned and digitized by a receiver ("RCVR") 934, and processed by a demodulator ("DEMOD") 936 to obtain detected data symbols. A receive ("RX") data processor 938 processes the detected data symbols and provides decoded data for the device 902 and the forward link signaling. A controller 940 receives power control commands and other information to control data transmission and to control transmit power on the reverse link to the device 904.

The controllers 940 and 932 direct various operations of the device 902 and the device 904, respectively. For example, a controller may determine an appropriate filter, reporting information about the filter, and decode information using a filter. Data memories 942 and 944 may store program codes and data used by the controllers 940 and 932, respectively.

FIG. 9 also illustrates that the communication components may include one or more components that perform messaging operations as taught herein. For example, a message control component 946 may cooperate with the controller 940 and/or other components of the device 902 to send and receive signals to another device (e.g., device 904) as taught herein. Similarly, a message control component 948 may cooperate with the controller 932 and/or other components of the device 904 to send and receive signals to another device (e.g., device 902). It should be appreciated that for each device 902 and 904 the functionality of two or more of the described components may be provided by a single component. For example, a single processing component may provide the functionality of the message control component 946 and the controller 940 and a single processing component may provide the functionality of the message control component 948 and the controller 932.

The teachings herein may be incorporated into (e.g., implemented within or performed by) a variety of apparatuses (e.g., devices). For example, each node may be configured, or referred to in the art, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Certain nodes also may be referred to as access terminals. An access terminal also may be known as a subscriber station, a subscriber unit, a mobile station, a remote station, a remote terminal, a user terminal, a user agent, a user device, or user equipment. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless node may thus include various components that perform functions based on data transmitted by or received at the wireless node. For example, an access point and an access terminal may include an antenna for transmitting and receiving signals (e.g., messages relating to control and/or data). An access point also may include a traffic manager configured to manage data traffic flows that its receiver receives from a plurality of wireless nodes or that its transmitter transmits to a plurality of wireless nodes. In addition, an access terminal may include a user interface configured to output an indication based on received data. For example, as discussed herein in some aspects such data may be received after issuance of a RUM and before issuance of a resource release message.

A wireless device may communicate via one or more wireless communication links that are based on or otherwise support any suitable wireless communication technology. For example, in some aspects a wireless device may associate with a network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 408 and 414 and receivers 410 and 416) that may include various components (e.g., signal generators and signal processors) that facilitate communication over a wireless medium.

Figure 10:
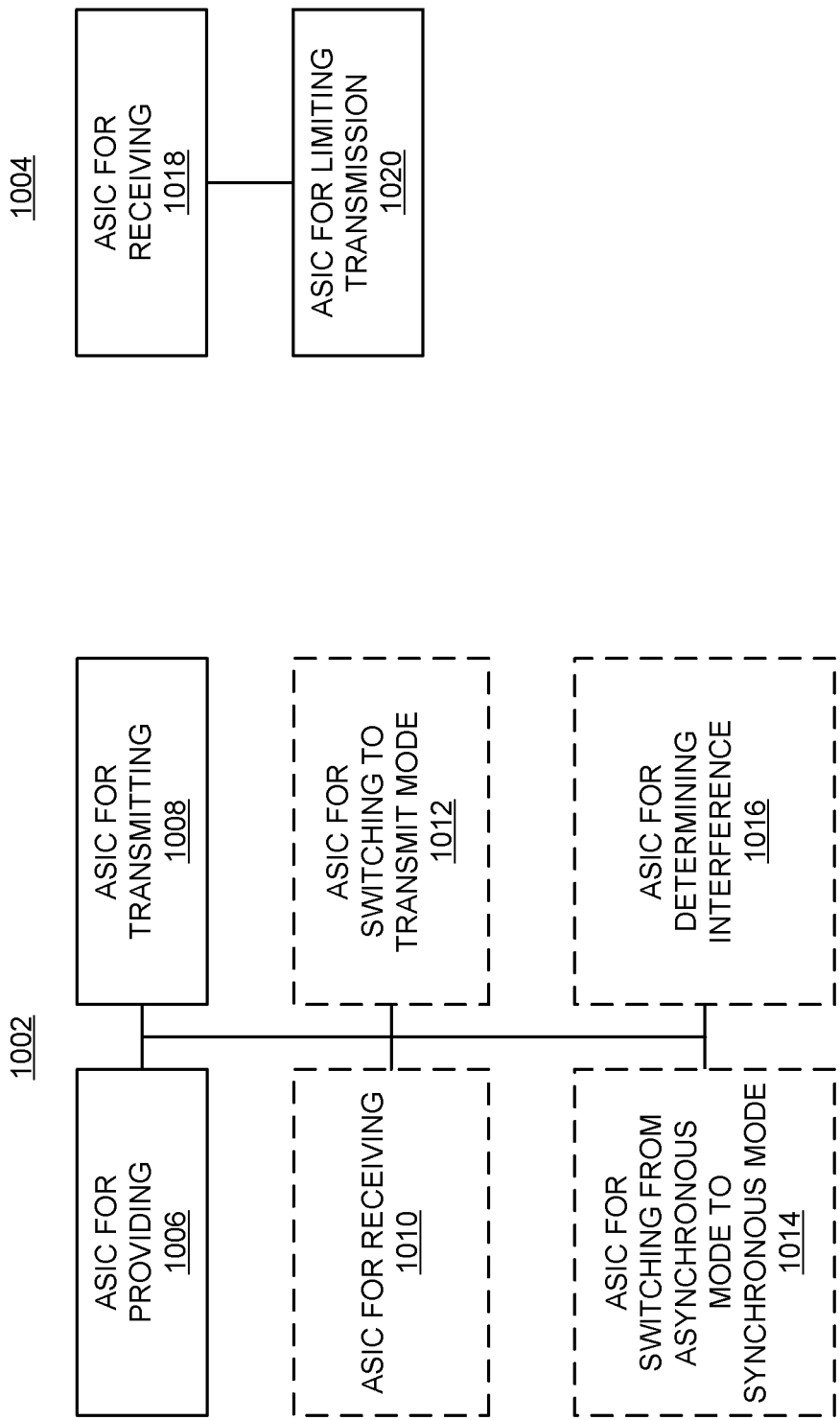
FIGS. 10 and 11 are simplified block diagrams of several sample aspects of apparatuses configured to provide interference management messaging as taught herein.
Figure 11:
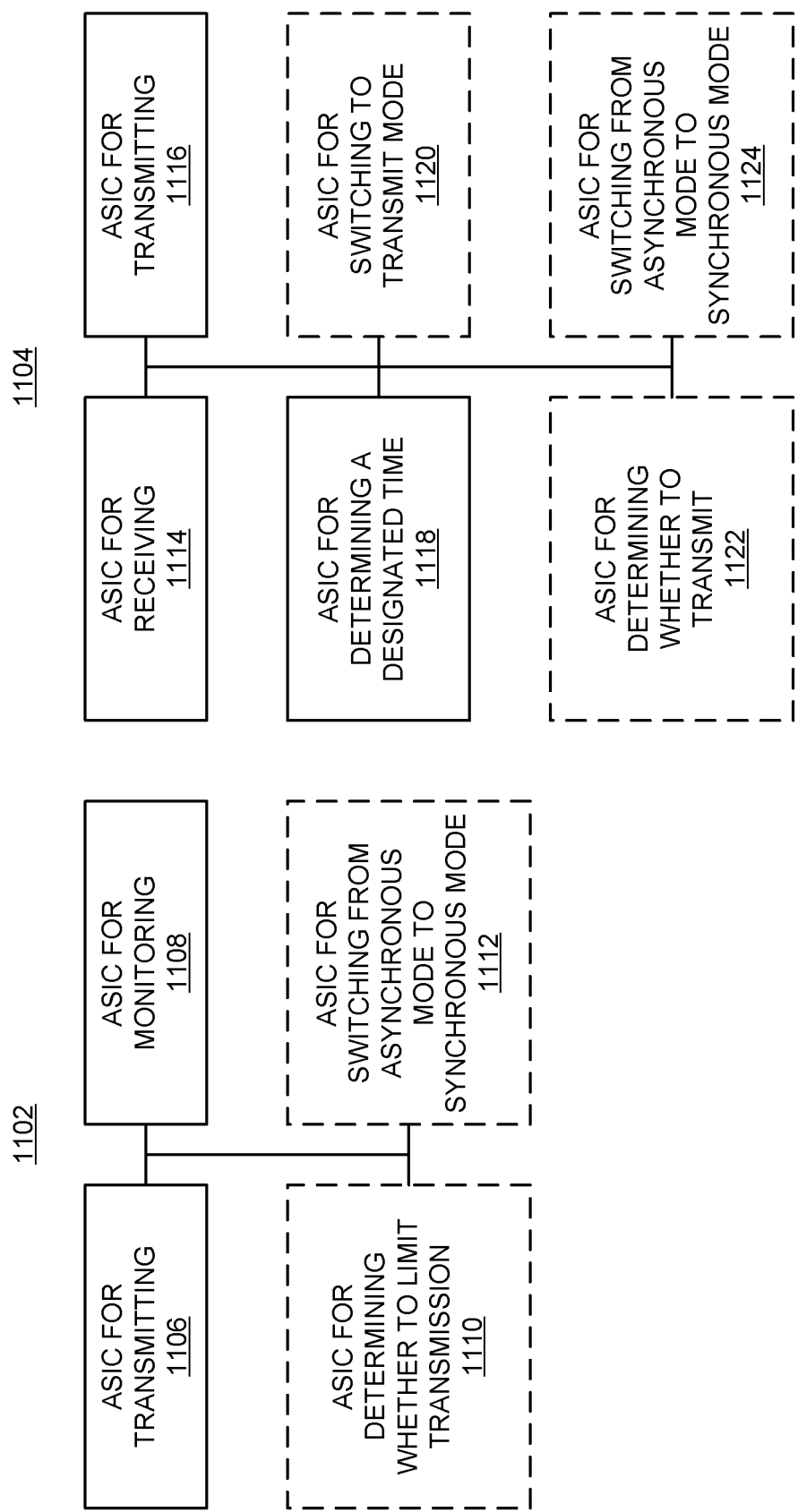

The components described herein may be implemented in a variety of ways. FIG. 10 depicts apparatuses 1002 and 1004 that are representative of receiving and transmitting nodes, respectively and FIG. 11 depicts apparatuses 1102 and 1104 that are representative of transmitting and receiving nodes, respectively. The apparatuses 1002, 1004, 1102, and 1104 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatus 1002, 1004, 1102, and 1104 may include one or more modules that may perform one or more of the functions described above with regard to various figures. For example, an ASIC for providing 1006 may correspond to, for example, a message controller 418 as discussed herein. An ASIC for transmitting 1008 or 1116 may correspond to, for example, a transmitter 408 as discussed herein. An ASIC for receiving 1010 or 1114 may correspond to, for example, a receiver 410 as discussed herein. An ASIC for switching to transmit mode 1012 or 1120 may correspond to, for example, a communication controller 424 as discussed herein. An ASIC for switching from asynchronous mode to synchronous mode 1014 or 1124 may correspond to, for example, a mode controller 430 as discussed herein. An ASIC for determining interference 1016 may correspond to, for example, an interference controller 422 as discussed herein. An ASIC for receiving 1018 may correspond to, for example, a receiver 416 as discussed herein. An ASIC for limiting transmission 1020 may correspond to, for example, a communication controller 426 as discussed herein. An ASIC for transmitting 1106 may correspond to, for example, a transmitter 414 as discussed herein. An ASIC for monitoring 1108 may correspond to, for example, a receiver 416 as discussed herein. An ASIC for determining whether to limit transmission 1110 may correspond to, for example, a communication controller 426 as discussed herein. An ASIC for switching from asynchronous mode to synchronous mode 1112 may correspond to, for example, a mode controller 432 as discussed herein. An ASIC for determining a designated time 1118 may correspond to, for example, a message controller 418 as discussed herein. An ASIC for determining whether to transmit 1122 may correspond to, for example, a communication controller 424 as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatus 1002, 1004, 1102, and 1104 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 10 and 11 as well as other components and functions described herein, may be implemented using any suitable means. Such means also may be implemented, at least in part, using corresponding structure as taught herein. For example, the components described above in conjunction with the "ASIC for" components of FIGS. 10 and 11 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   transmitting, from a first node, a first interference management message that comprises a request for reduction in interference;
   transmitting, from the first node, a second interference management message that indicates that the request for reduction in interference is terminated;
   receiving, at the first node, data during a first period of time that follows the transmission of the first interference management message and precedes the transmission of the second interference management message;
   switching, by the first node, to a transmitting mode at defined intervals during the first period of time;
   receiving, at the first node, during a second period of time that follows the transmission of the first interference management message and precedes the transmission of the second interference management message, a request to transmit an interference management message, wherein the second period of time ends at one of the defined intervals; and
   transmitting, from the first node, a third interference management message during another switch, by the first node, to the transmitting mode at the end of the second period of time based on the received request.

2. The method of claim 1, wherein the request for reduction in interference relates to an unspecified amount of time.

3. The method of claim 1, wherein the request for reduction in interference expires after a defined period of time.

4. The method of claim 1, further comprising switching from an asynchronous mode of operation to a synchronous mode of operation by:
   setting the defined intervals equal to a timeslot size; and
   disabling transmission of interference management messages that indicate that a request for reduction in interference is terminated.

5. The method of claim 4, further comprising setting a transmission opportunity time period equal to the timeslot size.

6. The method of claim 1 further comprising:
   receiving a request to transmit to the first node from a second node;
   determining interference at the first node; and
   delaying, based on the determined interference, transmission of a message that grants the received request to transmit to the first node.

7. The method of claim 6, wherein the transmission is delayed if the monitored interference is greater than or equal to a threshold interference level.

8. The method of claim 1, wherein the first interference management message is transmitted at a constant power spectral density.

9. The method of claim 1, wherein the first interference management message further comprises a priority indication indicative of a level of disadvantage associated with reception of data.

10. An apparatus for wireless communication, comprising:
    a message controller configured to provide:
       a first interference management message that comprises a request for a reduction in interference, and
       a second interference management message that indicates that the request for reduction in interference is terminated;
    a transmitter configured to transmit the first interference management message and the second interference management message;
    a receiver configured to receive data during a first period of time that follows the transmission of the first interference management message and precedes the transmission of the second interference management message; and
    a communication controller configured to switch to a transmitting mode at defined intervals during the first period of time,
    wherein the receiver is further configured to receive, during a second period of time that follows the transmission of the first interference management message and precedes the transmission of the second interference management message, a request to transmit an interference management message,
    wherein the second period of time ends at one of the defined intervals; and
    wherein the transmitter is further configured to transmit a third interference management message during another switch to the transmitting mode at the end of the second period of time based on the received request.

11. The apparatus of claim 10, wherein the request for reduction in interference relates to an unspecified amount of time.

12. The apparatus of claim 10, wherein the request for reduction in interference expires after a defined period of time.

13. The apparatus of claim 10, further comprising a mode controller configured to switch from an asynchronous mode of operation to a synchronous mode of operation by:
    setting the defined intervals equal to a timeslot size; and
    disabling transmission of interference management messages that indicate that a request for reduction in interference is terminated.

14. The apparatus of claim 13, wherein the mode controller is further configured to set a transmission opportunity time period equal to the timeslot size.

15. The apparatus of claim 10, wherein:
    the apparatus further comprises a receiver configured to receive a request to transmit to the apparatus from a node;
    the apparatus further comprises an interference controller configured to determine interference at the apparatus; and
    the message controller is further configured to delay, based on the determined interference, transmission of a message that grants the received request to transmit to the apparatus.

16. The apparatus of claim 15, wherein the message controller is further configured to delay the transmission if the monitored interference is greater than or equal to a threshold interference level.

17. The apparatus of claim 10, wherein the first interference management message is transmitted at a constant power spectral density.

18. The apparatus of claim 10, wherein the first interference management message further comprises a priority indication indicative of a level of disadvantage associated with reception of data.

19. An apparatus for wireless communication, comprising:
means for providing:
a first interference management message that comprises a request for reduction in interference, and
a second interference management message that indicates that the request for reduction in interference is terminated;
means for transmitting the first interference management message and the second interference management message;
means for receiving data during a first period of time that follows the transmission of the first interference management message and precedes the transmission of the second interference management message;
means for switching to a transmitting mode at defined intervals during the first period of time;
means for receiving, during a second period of time that follows the transmission of the first interference management message and precedes the transmission of the second interference management message, a request to transmit an interference management message, wherein the second period of time ends at one of the defined intervals; and
means for transmitting a third interference management message during another switch to the transmitting mode at the end of the second period of time.

20. The apparatus of claim 19, wherein the request for reduction in interference relates to an unspecified amount of time.

21. The apparatus of claim 19, wherein the request for reduction in interference expires after a defined period of time.

22. The apparatus of claim 19, further comprising means for switching from an asynchronous mode of operation to a synchronous mode of operation by:
setting the defined intervals equal to a timeslot size; and
disabling transmission of interference management messages that indicate that a request for reduction in interference is terminated.

23. The apparatus of claim 22, wherein the means for switching from an asynchronous mode of operation to a synchronous mode of operation is configured to set a transmission opportunity time period equal to the timeslot size.

24. The apparatus of claim 19, wherein:
the apparatus further comprises means for receiving a request to transmit to the apparatus from a node;
the apparatus further comprises means for determining interference at the apparatus; and
the means for providing is configured to delay, based on the determined interference, transmission of a message that grants the received request to transmit to the apparatus.

25. The apparatus of claim 24, wherein the means for providing is further configured to delay the transmission if the monitored interference is greater than or equal to a threshold interference level.

26. The apparatus of claim 19, wherein the first interference management message is transmitted at a constant power spectral density.

27. The apparatus of claim 19, wherein the first interference management message further comprises a priority indication indicative of a level of disadvantage associated with reception of data.

28. A computer-program product for wireless communication, comprising:
non-transitory computer-readable medium comprising codes executable to:
transmit, from a first node, a first interference management message that comprises a request for reduction in interference;
transmit, from the first node, a second interference management message that indicates that the request for reduction in interference is terminated;
receive, at the first node, data during a first period of time that follows the transmission of the first interference management message and precedes the transmission of the second interference management message;
switch, by the first node, to a transmitting mode at defined intervals during the first period of time;
receive, at the first node, during a second period of time that follows the transmission of the first interference management message and precedes the transmission of the second interference management message, a request to transmit an interference management message, wherein the second period of time ends at one of the defined intervals; and
transmit, from the first node, a third interference management message during another switch, by the first node, to the transmitting mode at the end of the second period of time based on the received request.

29. An access point, comprising:
an antenna;
a message controller configured to provide:
a first interference management message that comprises a request for a reduction in interference, and
a second interference management message that indicates that the request for reduction in interference is terminated;
a transmitter configured to transmit the first interference management message and the second interference management message via the antenna;
a receiver configured to receive data during a first period of time that follows the transmission of the first interference management message and precedes the transmission of the second interference management message; and
a communication controller configured to switch to a transmitting mode at defined intervals during the first period of time,
wherein the receiver is further configured to receive, during a second period of time that follows the transmission of the first interference management message and precedes the transmission of the second interference management message, a request to transmit an interference management message,
wherein the second period of time ends at one of the defined intervals; and
wherein the transmitter is further configured to transmit a third interference management message during another switch to the transmitting mode at the end of the second period of time based on the received request.

30. An access terminal, comprising:
a message controller configured to provide:

a first interference management message that comprises a request for a reduction in interference, and a second interference management message that indicates that the request for reduction in interference is terminated;

a transmitter configured to transmit the first interference management message and the second interference management message;

a user interface configured to output an indication based on data received after the transmission of the first interference management message and before the transmission of the second interference management message;

a receiver configured to receive data during a first period of time that follows the transmission of the first interference management message and precedes the transmission of the second interference management message; and a communication controller configured to switch to a transmitting mode at defined intervals during the first period of time, wherein the receiver is further configured to receive, during a second period of time that follows the transmission of the first interference management message and precedes the transmission of the second interference management message, a request to transmit an interference management message, wherein the second period of time ends at one of the defined intervals; and wherein the transmitter is further configured to transmit a third interference management message during another switch to the transmitting mode at the end of the second period of time based on the received request.

* * * * *